US007001275B2

(12) United States Patent
McCall

(10) Patent No.: US 7,001,275 B2

(45) Date of Patent: Feb. 21, 2006

(54) VIDEO POKER DICE GAME

(76) Inventor: David R. McCall, 2673 Hillgrass Rd., Las Vegas, NV (US) 89123

(*) Notice: Subject to any disclaimer, the term of this patent is extended or adjusted under 35 U.S.C. 154(b) by 134 days.

(21) Appl. No.: 10/334,818

(22) Filed: Dec. 30, 2002

(65) Prior Publication Data

US 2004/0127275 A1 Jul. 1, 2004

(51) Int. Cl.
*A63F 13/00* (2006.01)

(52) U.S. Cl. ........................................................ 463/22

(58) Field of Classification Search ................... 463/22
See application file for complete search history.

(56) References Cited

U.S. PATENT DOCUMENTS

| | | | | | |
|---|---|---|---|---|---|
| 614,524 | A | * | 11/1898 | Yardley | 273/146 |
| 645,112 | A | * | 3/1900 | Mapes | 273/146 |
| 809,293 | A | * | 1/1906 | Friedenthal | 273/146 |
| 1,523,615 | A | * | 1/1925 | Stern | 273/146 |
| 4,506,890 | A | | 3/1985 | Murry | |
| 4,715,604 | A | | 12/1987 | Okada | |
| 5,125,660 | A | * | 6/1992 | Stahl | 273/146 |
| 5,145,175 | A | * | 9/1992 | Gathman et al. | 273/146 |
| 5,393,057 | A | | 2/1995 | Marnell, II | |
| 5,791,649 | A | * | 8/1998 | DiSandro | 273/243 |
| 6,062,563 | A | * | 5/2000 | de Keller | 273/274 |
| 6,120,377 | A | | 9/2000 | McGinnis, Sr. et al. | |
| 6,123,333 | A | * | 9/2000 | McGinnis, Sr. et al. | 273/146 |
| 6,173,955 | B1 | * | 1/2001 | Perrie et al. | 273/146 |
| 6,305,686 | B1 | | 10/2001 | Perrie et al. | |
| 6,322,078 | B1 | | 11/2001 | Adams | |

* cited by examiner

*Primary Examiner*—Xuan M. Thai
*Assistant Examiner*—Robert Mosser
(74) *Attorney, Agent, or Firm*—Rob L. Phillips; Greenberg Traurig

(57) ABSTRACT

An electronically implemented wagering game based on a combination of dice and poker games. Five twenty-four sided dice include depictions of traditional card suits, namely hearts, spades, clubs and diamonds. Each suit is represented by values one through six. Winning combinations are based on traditional poker hands and hybrid combinations unique to the present invention. Hybrid combinations include “four of a kind flushes” and “full house flushes.” Players preferably place a five coin wager entitling them to hold and discard specific die a maximum of four times. After each roll of the dice the player may select which specific die to hold and which to re-roll. Based on the resultant combinations and number of rolls utilized, the player is paid according to a predetermined pay table. For example, the less the number of rolls utilized to achieve a particular winning combination the higher the corresponding pay out.

11 Claims, 4 Drawing Sheets

Fig. 3

| | ROLL | | | | | | | | | |
|---|---|---|---|---|---|---|---|---|---|---|
| | FIRST | | | | | SECOND | | | | |
| | COIN | | | | | | | | | |
| | 1 | 2 | 3 | 4 | 5 | 1 | 2 | 3 | 4 | 5 |
| 2 PAIR (4's OR BETTER) | 30 | 35 | 40 | 45 | 50 | 25 | 30 | 35 | 40 | 45 |
| ANY 2 PAIR-ANY SUIT | 35 | 40 | 45 | 50 | 55 | 30 | 35 | 40 | 45 | 50 |
| ANY 2 PAIR -SAME SUIT | 40 | 45 | 50 | 55 | 60 | 35 | 40 | 45 | 50 | 55 |
| 3 OF A KIND | 45 | 50 | 55 | 60 | 65 | 40 | 45 | 50 | 55 | 60 |
| | | | | | | | | | | |
| 3 OF A KIND-SAME SUIT | 55 | 60 | 65 | 70 | 75 | 50 | 55 | 60 | 65 | 70 |
| LOW STRAIGHT | 60 | 65 | 70 | 75 | 80 | 55 | 60 | 65 | 70 | 75 |
| HIGH STRAIGHT | 65 | 70 | 75 | 80 | 85 | 60 | 65 | 70 | 75 | 80 |
| FLUSH | 70 | 75 | 80 | 85 | 90 | 65 | 70 | 75 | 80 | 85 |
| | | | | | | | | | | |
| FULL HOUSE | 90 | 95 | 100 | 105 | 110 | 85 | 90 | 95 | 100 | 105 |
| FULL HOUSE-SAME SUIT | 95 | 100 | 105 | 110 | 115 | 90 | 95 | 100 | 105 | 110 |
| 4 OF A KIND | 100 | 105 | 110 | 115 | 120 | 95 | 100 | 105 | 110 | 115 |
| 4 OF A KIND-SAME SUIT | 105 | 110 | 115 | 120 | 125 | 100 | 105 | 110 | 115 | 120 |
| | | | | | | | | | | |
| 5 OF A KIND | 130 | 135 | 140 | 145 | 150 | 125 | 130 | 135 | 140 | 145 |
| 5 OF A KIND-SAME SUIT | 135 | 140 | 145 | 150 | 155 | 130 | 135 | 140 | 145 | 150 |
| LOW STRAIGHT FLUSH | 140 | 145 | 150 | 155 | 500 | 135 | 140 | 145 | 150 | 450 |
| HIGH STRAIGHT FLUSH | 145 | 150 | 155 | 160 | 1000 | 140 | 145 | 150 | 155 | 900 |

80 70 70 84 82 84 90 90 91 91

Fig. 3 CONTINUED

| | ROLL | | | | | | | | | | | | | | |
|---|---|---|---|---|---|---|---|---|---|---|---|---|---|---|---|
| | THIRD | | | | | FOURTH | | | | | FIFTH | | | | |
| | COIN | | | | | | | | | | | | | | |
| | 1 | 2 | 3 | 4 | 5 | 1 | 2 | 3 | 4 | 5 | 1 | 2 | 3 | 4 | 5 |
| 2 PAIR (4's OR BETTER) | 20 | 25 | 30 | 35 | 40 | 15 | 20 | 25 | 30 | 35 | 10 | 15 | 20 | 25 | 30 |
| ANY 2 PAIR-ANY SUIT | 25 | 30 | 35 | 40 | 45 | 20 | 25 | 30 | 35 | 40 | 15 | 20 | 25 | 30 | 35 |
| ANY 2 PAIR -SAME SUIT | 30 | 35 | 40 | 45 | 50 | 25 | 30 | 35 | 40 | 45 | 20 | 25 | 30 | 35 | 40 |
| 3 OF A KIND | 35 | 40 | 45 | 50 | 55 | 30 | 35 | 40 | 45 | 50 | 25 | 30 | 35 | 40 | 45 |
| | | | | | | | | | | | | | | | |
| 3 OF A KIND-SAME SUIT | 45 | 50 | 55 | 60 | 65 | 40 | 45 | 50 | 55 | 60 | 35 | 40 | 45 | 50 | 55 |
| LOW STRAIGHT | 50 | 55 | 60 | 65 | 70 | 45 | 50 | 55 | 60 | 65 | 40 | 45 | 50 | 55 | 60 |
| HIGH STRAIGHT | 55 | 60 | 65 | 70 | 75 | 50 | 55 | 60 | 65 | 70 | 45 | 50 | 55 | 60 | 65 |
| FLUSH | 60 | 65 | 70 | 75 | 80 | 55 | 60 | 65 | 70 | 75 | 50 | 55 | 60 | 65 | 70 |
| | | | | | | | | | | | | | | | |
| FULL HOUSE | 80 | 85 | 90 | 95 | 100 | 75 | 80 | 85 | 90 | 95 | 70 | 75 | 80 | 85 | 90 |
| FULL HOUSE-SAME SUIT | 85 | 90 | 95 | 100 | 105 | 80 | 85 | 90 | 95 | 100 | 75 | 80 | 85 | 90 | 95 |
| 4 OF A KIND | 90 | 95 | 100 | 105 | 110 | 85 | 90 | 95 | 100 | 105 | 80 | 85 | 90 | 95 | 100 |
| 4 OF A KIND-SAME SUIT | 95 | 100 | 105 | 110 | 115 | 90 | 95 | 100 | 105 | 110 | 85 | 90 | 95 | 100 | 105 |
| | | | | | | | | | | | | | | | |
| 5 OF A KIND | 120 | 125 | 130 | 135 | 140 | 115 | 120 | 125 | 130 | 135 | 110 | 115 | 120 | 125 | 130 |
| 5 OF A KIND-SAME SUIT | 125 | 130 | 135 | 140 | 145 | 120 | 125 | 130 | 135 | 140 | 115 | 120 | 125 | 130 | 135 |
| LOW STRAIGHT FLUSH | 130 | 135 | 140 | 145 | 400 | 125 | 130 | 135 | 140 | 350 | 120 | 125 | 130 | 135 | 300 |
| HIGH STRAIGHT FLUSH | 135 | 140 | 145 | 150 | 800 | 130 | 135 | 140 | 145 | 700 | 125 | 130 | 135 | 140 | 600 |

VIDEO POKER DICE GAME

FIELD OF THE INVENTION

The present invention relates to electronically implemented gaming devices. More particularly, a plurality of computer generated twenty-four sided dice are displayed on a video screen. Each die is identical having one through six depictions of hearts, spades, clubs and diamonds. A pre-established pay table categorizes pay outs for each pre-defined winning combination of dice and the number of rolls utilized to achieve the winning combination.

BACKGROUND OF THE INVENTION

In recent years, the popularity of gaming has been on a steep incline. As a result, legalized gaming is found in most states of the United States and new foreign jurisdictions continue to join the gaming ranks. As such, gaming operators, including casinos have a constant appetite for new games of chance. Increasingly, the new games of chance are electronically implemented in the form of slot machines or video poker machines. Unfortunately, many of the new games are nothing more than gimmicks causing a player's interest to quickly fade.

The present invention is based on two of the most popular wagering props ever created, namely cards and dice. Five identical twenty-four sided dice each have one through six depictions of hearts, spades, clubs and diamonds are utilized by the present invention. Pre-defined winning combinations of the dice and the number of rolls utilized determine the pay out amounts. The patent literature includes various attempts at combining dice and poker into a single electronically implemented game. As set forth below, the previous attempts have been relatively unsuccessful for one reason or another.

U.S. Pat. No. 6,123,333 (the '333 Patent) to McGinnis, Sr. et al., teaches the use of five identical twenty-sided dice having Ten through Ace of the four card suits. Therefore, each dice has a Ten, Jack, Queen, King and Ace of hearts, spades, clubs and diamonds. The '333 Patent discloses pay tables setting forth various winning combinations. The winning combinations are based on numerical values and the suits thereof. The invention contemplates an initial roll and two re-rolls. Re-rolls indicating that a player may select certain dice values and suits to hold and discard. The discarded dice are then re-rolled up to two times. The use of only twenty-sided dice does not allow a significantly diverse pay table as evidenced by the pay tables disclosed therein which suggest pay outs for only five of a kind, four of a kind, full houses and three of a kind.

U.S. Pat. No. 6,120,377 (the '377 Patent) to McGinnis, Sr., et al., also describes a wagering game played with twenty-sided dice. The '377 Patent is a simplified version of the '333 Patent discussed above. The winning combinations are determined from three and four dice arrangements. Unfortunately, the use of only three and four dice seriously limits the winning combinations and ability to generate large jack pots.

U.S. Pat. No. 6,305,686 B1 (the '686 Patent) to Perrie et al., discloses a method of playing a bonus casino poker having X number of dice. The dice of the '686 Patent are conventional (e.g. six-sided with one through six markings on each side). The use of conventional dice does not allow the large number of combinations possible with the present invention.

By utilizing twenty-four sided dice and six values of four card suits, the present invention includes a broad pay table having more possible unique winning combinations than the previous dice poker style combinations.

SUMMARY OF THE INVENTION

It is the primary objective of the present invention to provide a wagering game combining dice and poker into a single game.

It is a further objective of the present invention to provide a pay table related to a number of dice rolls, up to a preferred maximum of five, a player utilizes per game play.

It is a further objective of the present invention to create new possible winning combinations previously unavailable in either dice or card games independently.

It is a further objective of the present invention to provide a game that is easy to understand and play thereby maximizing the attractiveness of the game.

Yet another objective of the present invention to provide a new and exciting electronically implemented game.

These and further objectives will become apparent from the attached drawings and the following description of the embodiments of the present invention.

The above objectives are achieved through the present invention by providing a casino player with an electronically implemented game based on a combination of poker and dice games. Five identical twenty-four sided dice include representations of conventional card suits, namely hearts, spades, clubs and diamonds. Each suit is represented by six unique values from one to six. In this fashion, each suit, having values one through six, occupies six sides of the twenty-four sided dice. Winning combinations include traditional poker hands as well as hybrid combinations of the same made possible by the suits and values depicted on each die. For example, a hybrid winning combination includes a "three of a kind flush" wherein three of the same suit and value appear (i.e. this combination is not possible with traditional one deck poker).

BRIEF DESCRIPTION OF THE DRAWINGS

The invention is illustrated by the following drawings:

FIG. 3 illustrates a table of possible winning combinations and possible corresponding payouts of the present invention.

EMBODIMENTS OF THE PRESENT INVENTION

Figure 1:
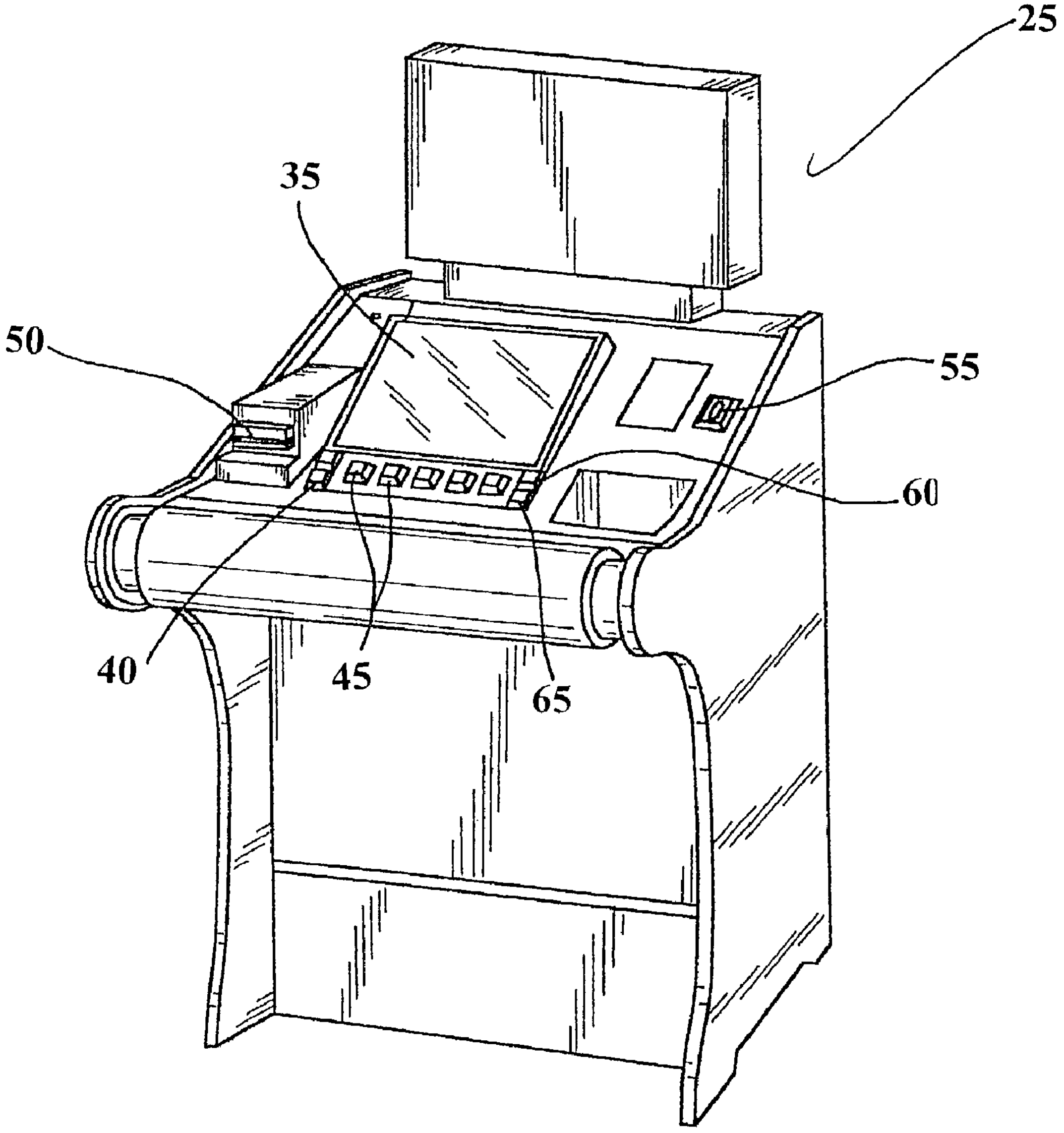
FIG. 1 illustrates a video style gaming machine used to implement the present invention.
Figure 2:
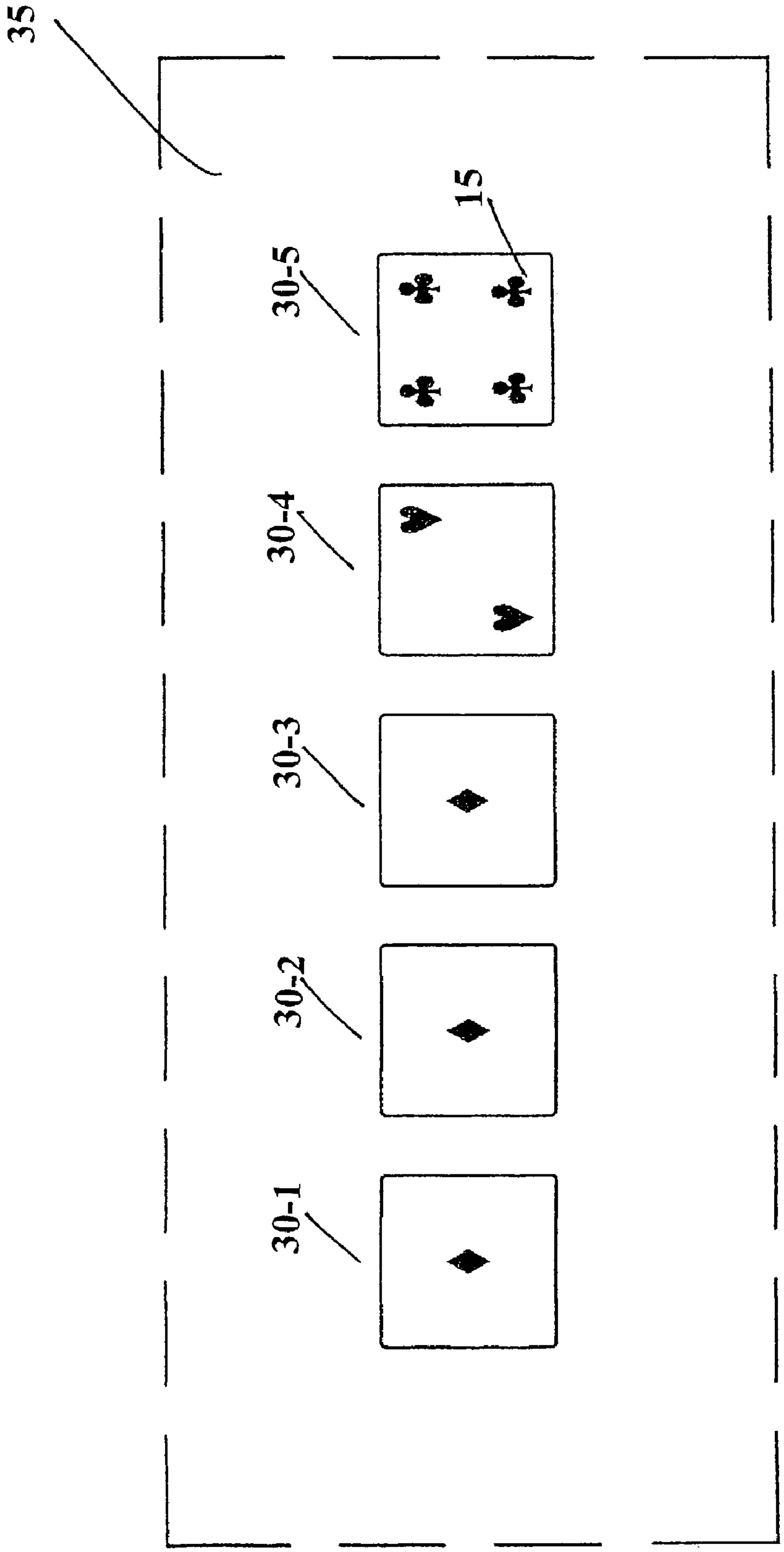
FIG. 2 illustrates a display of the present invention once a simulated roll of five twenty-four sided dice roll has occurred.

As illustrated in FIG. 1, a traditional video poker style machine 25 which can be used to implement the present invention. However, in place of traditional displayed video playing cards, five dice faces 30-1 through 30-5 (as shown in FIG. 2) appear on a video display 35 of the video machine 25. It is also contemplated that five twenty-four sided dice may be shown such that the selected dice face is evident. The video machine 25 includes a roll button 40, re-roll/hold buttons 45, card reader 50, coin slot 55, bet maximum coins button 60 and bet one coin button 65. In addition to the external features illustrated in FIG. 1, the present invention is substantially controlled by an internal controller such as a computer microprocessor (not shown). For example, the microprocessor causes the generation of five random numbers which correspond to each dice and determine each of the five dice indicia which will initially appear on the display screen 35. The microprocessor may be programmed to generate the random numbers or may communicate and control one or more independent random number generators. In other words, the microprocessor simulates the roll of five twenty-four sided dice. It is known in the art to utilize a microprocessor in combination with a random number generator to control various functions of a gaming machine and therefore the specific details are not re-iterated herein.

FIG. 2 illustrates the video display 35 depicting the five dice faces 30-1 through 30-5. Each face 30-1 through 30-5 depicts thereon a unique indicia 15 preferably in the form of the traditional four card suits and corresponding values thereof. The values preferably have a range of 1 through 6, each value appearing only once for each suit on each die. FIG. 2 shows a three of a kind flush formed by faces 30-1 through 30-3. The player may select to take a payout corresponding to a three of a kind flush in one roll as set forth in the example pay table shown in FIG. 3. Alternatively, the player may elect to discard faces 30-4 and 30-5 and re-roll in an attempt to improve the hand and corresponding payout.

In response to a player wager, initial dice faces 30-1 through 30-5 appear and the re-roll/hold buttons 45 provide a means for a player to retain certain dice faces and to discard certain dice faces for random replacement. In another embodiment, a touchscreen display provides a means for said player to retain and discard dice faces. Should the player be satisfied with the five dice faces 30-1 through 30-5 that initially appear, the player may discard zero of the dice faces 30-1 through 30-5 and receive an immediate pay out based on both the combination of the dice faces 30-1 through 30-5 and the number of rolls utilized (i.e. one in this example). The player may also decide to discard one or more of the dice faces 30-1 through 30-5. Discarded dice faces 30-1 through 30-5 are replaced with new randomly generated dice faces in the same simulation manner the original dice faces 30-1 through 30-5 were generated. In this manner the same discarded face may reappear if the simulated roll of the die results in the same outcome. Preferably players may discard and replace dice faces a maximum of four times subsequent to the initial random appearance of the dice faces.

In a first embodiment the present invention is played as follows:

a. a player inputs a wager and presses either bet max coins button 60 or bet one coin button 65;

b. the player activates gaming machine by pressing the roll button 40;

c. a microprocessor causes the generation of random numbers thereby causing five dice faces 30 to appear on the display screen 35;

d. based on the five dice faces 30 that appear the player has two options:

i. accept the pay out, if any, corresponding to the five dice faces 30 that appeared; or ii. decide to re-roll one or more of the dice for an additional wager;

e. if the player elects to re-roll one or more of the dice, the player using the re-roll/hold buttons 45 to select which dice to hold and which to re-roll;

f. as set forth in step d the player now has the same two options but the pay out, if any, is now based on an additional roll of the dice; and g. the player can repeat step e up to four times thereby having an opportunity to roll the dice five times in total. Each extra roll causes the pay outs, if any, corresponding to the five dice faces that appear to decrease.

In this fashion there is a strategy with regard to re-rolling certain dice. The player may decide to take the pay out already realized or may determine that an improved dice combination is possible thereby justifying another roll and wager. Moreover, certain situations may dictate that a player change his or her strategy based upon the random dice faces that may appear during multiple rolls. For example, a player may be attempting to obtain a five of a kind flush but as the player re-rolls it is apparent that a full house flush is much more likely based on the random dice faces that have been displayed.

In a first embodiment, a player may cause five coins to be wagered thereby allowing the player the maximum of five total rolls of the dice. Should the player only use two rolls, the three remaining credits are returned to the player. In another embodiment, the player may initially cause one coin to be wagered and continue to cause a single coin to be wagered for each additional roll utilized. Alternatively, an operator may provide that multiple coins can be wagered per roll. By way of example, nearly every electronic gaming machine currently in operation provides players with the opportunity to wager multiple coins per play. More specifically, video poker players can wager from one to five coins per play. Playing the maximum number of coins traditionally entitles the player to increased pay outs and participation in progressive jackpots. However, the ultimate wagering opportunities implemented are not critical and do not limit the scope of the present invention.

FIG. 3 illustrates a first table 80 of winning combinations 82 and corresponding payouts 84 possible with the five twenty-four sided dice of the present invention. The highest valued combination achievable is the five of a kind flush (e.g. five identical card suits and values). Although, lessor valued combinations can result in a pay out, the lowest valued pay out corresponding to a pay out in the illustrated table 80 is a pair of identical valued, but unsuited, cards (e.g. two identical card values with unmatched suits). The table 80 sets forth other possible winning combinations. It should be understood that the dice could have different indicia, symbols, depictions, etc, thereon without departing from the scope and spirit of the present invention.

Five columns 70 are each associated with the number of rolls of the dice. A comparison of the pay outs set forth in a first column, related to one roll, and the pay outs set forth in a third column, related to three rolls, reveals that the pay outs for identical results decrease as the number of rolls increase. The trend continues if a player elects to use all five rolls. Moreover, enhanced payouts 90, 91 result from obtaining the most difficult outcomes (e.g. low and high straight flush) when five coins are wagered.

Although the invention has been described in detail with reference to various embodiments, additional variations and modifications exist within the scope and spirit of the invention as described and defined in the following claims.

What is claimed is:

1. An electronically implemented method of conducting a wagering game including the steps of:

a. accepting a player wager;

b. randomly selecting and displaying a single face of each of a plurality of twenty-four side dice, said die each being identical and having unique indicia on each face such that each die face includes indicia corresponding to one, two, three, four, five or six spades, hearts, diamonds and clubs wherein the indicia are arranged in a manner corresponding to pips arranged on conventional six-sided die;

c. allowing a player to discard zero or any number of the plurality of the displayed dice faces;

d. re-randomly selecting and displaying a replacement dice face corresponding to each of the discarded dice faces;

e. repeating steps c and d a predefined maximum number of times, said predefined maximum number of times dependent upon said wager amount such that the larger the player wager the greater the predefined maximum number of times steps c and d may be repeated; and f. providing pay outs based on a pre-defined pay table associated with pre-established winning combinations of the plurality of dice face indicia, said pay outs being determined once zero of the plurality of dice faces are discarded or steps c and d have been repeated the predefined maximum number of times, whichever occurs first.

2. The method of claim 1 further comprising forming said game indicia of traditional card suits of hearts, diamonds, spades and clubs, each said suit being represented six times on the plurality of twenty-four sided dice.

3. The method of claim 1 further comprising said pay outs being a function of the number of times discarded dice faces are re-randomly selected and displayed as set forth in steps c and d.

4. The method of claim 1 further comprising establishing four as the maximum number of times dice faces may be discarded.

5. The method of claim 4 further comprising requiring a one unit wager amount for each of the maximum number of times the dice faces may be discarded.

6. The method of claim 1 further comprising returning to the player a portion of the wager amount in response to the player not discarding and replacing dice face indicia each of the predefined maximum number of times corresponding to the player wager.

7. An electronically implemented method of conducting a wagering game including the steps of:

a. accepting a first player wager;

b. randomly selecting and displaying a single face of each of a plurality of twenty-four side dice, said die each being identical and having unique indicia on each face such that each die face includes indicia corresponding to one, two, three, four, five or six spades, hearts, diamonds and clubs wherein the indicia are arranged in a manner corresponding to pips arranged on conventional six-sided die;

c. allowing a player to discard zero or any number of the plurality of the displayed dice faces;

d. in response to the first player wager re-randomly selecting and displaying a replacement dice face for each of the discarded dice faces;

e. in response to a successive player wager, repeating steps c and d, steps c and d being repeatable a predefined maximum number of times; and f. providing pay outs based on a predefined pay table associated with pre-established winning combinations of the plurality of dice face indicia, said pay outs being determined once no successive player wager has been placed or steps c and d have been repeated the predefined maximum number of times, whichever occurs first.

8. The method of claim 7 further comprising requiring one wager unit for each time steps c and d are repeated.

9. The method of claim 7 further comprising forming said game indicia of traditional card suits of hearts, diamonds, spades and clubs, each said suit being represented six times on the plurality of twenty-four sided dice.

10. The method of claim 7 further comprising said pay outs being dependent upon the number of times discarded dice faces are re-randomly selected and displayed as set forth in steps c and d.

11. The method of claim 7 further comprising establishing four as the maximum number of times dice faces may be discarded.

* * * * *